United States Patent [19]

Asp

[11] 4,089,781
[45] May 16, 1978

[54] METHOD OF AND APPARATUS FOR REGENERATING A PRESSURE FILTER

[75] Inventor: Hans Eskil Asp, Hammaro, Sweden

[73] Assignee: C J Wennberg AB, Sweden

[21] Appl. No.: 652,783

[22] Filed: Jan. 27, 1976

[30] Foreign Application Priority Data

Jan. 28, 1975 Sweden .............................. 7500861

[51] Int. Cl.² .......................................... B01D 41/04
[52] U.S. Cl. ........................................ 210/67; 210/68; 210/82; 210/108; 210/411
[58] Field of Search ................. 210/67, 68, 77, 79, 210/81, 82, 107, 108, 332, 333, 393, 402, 408, 411; 55/294, 341 NT

[56] References Cited

U.S. PATENT DOCUMENTS

| 1,348,159 | 8/1920 | Down | 210/68 |
| 1,498,061 | 6/1924 | Adams | 55/294 |
| 1,846,914 | 2/1932 | Sharp | 100/174 |
| 2,190,941 | 2/1940 | Gardner | 100/174 |
| 2,780,363 | 2/1957 | Pew | 210/82 |
| 3,095,289 | 6/1963 | Egan | 55/96 X |
| 3,443,696 | 5/1969 | Schutte | 55/242 X |
| 3,716,968 | 2/1973 | Mischke | 55/294 |

FOREIGN PATENT DOCUMENTS

| 2,533,229 | 2/1976 | Germany | 210/77 |

*Primary Examiner*—Frank Sever
*Attorney, Agent, or Firm*—Craig & Antonelli

[57] ABSTRACT

A method of and an apparatus for regenerating a pressure filter in which the liquid to be filtered is flown through a filter medium arranged in such a way as to partition the interior of the filter housing into a pressure chamber adapted to receive the liquid to be filtered and into a filtrate receiving chamber from which the filtrate is discharged, wherein, for the purpose of regenerating the filter, the introduction of liquid is interrupted, this step being accompanied by the introduction of a pressurized gas into the pressure chamber of the filter in order substantially completely to remove from the filter both the liquid not yet filtered and the filtrate still present, and wherein, upon completion of the emptying step, the introduction of pressurized gas into the pressure chamber of the filter is interrupted and the filter medium on its side facing the pressure chamber is washed by means of a washing medium, this step being accompanied by the introduction of a pressurized gas into the filtrate receiving chamber in a directon opposite to the direction in which the first-mentioned pressurized gas was introduced, this step being carried out simultaneously with the said washing step and being continued until the material deposited on the filter medium has at least partially been removed.

16 Claims, 4 Drawing Figures

METHOD OF AND APPARATUS FOR REGENERATING A PRESSURE FILTER

The present invention relates to a method of regenerating a pressure filter adapted to filter liquids in which the liquid to be filtered is forced through a filter material or filter medium which is arranged in such a way as to partition the interior of the filter housing into a pressure chamber adapted to receive the liquid to be filtered and into a filtrate chamber from which the filtrate is to be discharged, and in which the particles present in the liquid to be filtered are separated from said liquid and deposited on said filter material or filter medium. In addition, the present invention relates to an apparatus adapted to carry the said method into effect.

Where a liquid has to be filtered, it is conventional to use an arrangement which is adapted, with the aid of a suitable filter medium, to remove from the liquid the desired constituents or the sludge particles contained therein, the liquid to be filtered or purified being kept in motion as it traverses the filter. With a view to the large number of problems arising in connection with filters, numerous methods and devices have been proposed in an effort to solve such problems; however, all of the hitherto proposed methods and devices have in common certain drawbacks which include, for example, a limited service life of the active components, poor reliability resulting from rapid changes in the effectiveness of the device, etc.

In the case of filtering devices which are not amenable to regeneration, the useful life of the filtering device and, particularly, of the filter membrane or filter medium, is in some cases relatively short and may be extremely short in other cases, the useful life capable of attainment depending, among other things, on the degree of contamination of the liquid to be filtered. In the case of filtering devices which are arranged to permit either complete or partial regeneration, use is made of a change in the direction of flow of the liquid, i.e. of the so-called reverse-flow washing principle, in order to remove from the filter medium the layer deposited thereon, the presence of such layer tending to impair the efficiency of the filtering device. Using the method just described, it is possible to attain a certain extension of the periods during which the filter medium will remain effective as well as of the total service life of the filter medium, but the filtering effect still tends to decrease rapidly during operation, and, besides that, large quantities of filtrate are lost, this being undesirable as it might add to environmental pollution.

In cases in which it is intended to retain sludge particles of small size, for example below 5 microns, it is frequently necessary to provide the filter medium with a filtering aid in the form of a pre-coat consisting, for example, of diatomaceous earth or the like in order to provide for a satisfactory filtering effect. Since such filtering aid will of necessity act as a contaminant, this method is bound to increase the complexity and the costs of filtration and to render more difficult the recovery of desirable substances from the sludge or filter cake. It has already been proposed to substitute for such filtering aids special-type filtering media which are extremely fine-meshed and which are used in the form of filter cartridges made, for example, of polypropene or cotton; while such filter cartridges in many cases exhibit a satisfactory filtering effect, their useful life is limited by the rapidity with which the filter medium will be clogged. Moreover, it is extremely difficult to regenerate such filter cartridges with the aid of known methods, and they are not adapted to be employed in continuous filtration processes and for extended periods of time.

It is a primary object of the present invention to avoid the aforementioned drawbacks of known methods of and devices for regenerating pressure filters of the type described in the preamble to this specification and thus to provide for a substantial extension of the service life of the filter media.

In order to attain the said object, there has been provided by the present invention a method of regenerating a pressure filter in which a liquid to be filtered is adapted to be flown through a filter medium arranged in such a way as to partition the interior of the filter housing into a pressure chamber adapted to receive the liquid to be filtered and into a filtrate receiving chamber from which the filtrate is adapted to be discharged, according to which, for the purpose of regenerating the filter, the introduction of liquid thereto is interrupted, this step being accompanied by the introduction of a pressurized gas into the pressure chamber of said filter in order substantially completely to remove from said filter both the liquid not yet filtered and the filtrate still present therein, and wherein, upon completion of such removing step, the introduction of pressurized gas into the pressure chamber of said filter is interrupted and the filter medium on its side facing said pressure chamber is washed by means of a washing medium, this latter step being accompanied by the introduction of a pressurized gas into the filtrate receiving chamber in a direction opposite to the direction in which the first-mentioned pressurized gas was introduced, this second gas-introducing step being effected simultaneously with said washing step and being continued until the material deposited on said filter medium has at least partially been removed.

There has also been provided by the present invention an apparatus for carrying into effect the regenerating method as aforesaid and adapted for use in conjunction with a pressure filter of the type described, said apparatus comprising one or more conduits connected to the pressure chamber and the filtrate receiving chamber, respectively, adapted to introduce thereinto a pressurized gas and provided with the necessary valve means, which, together with means controlling the means for introducing the liquid to be filtered and means for washing the filter medium, are adapted to be operated in such a manner that a pressurized gas may be introduced into the pressure chamber of said filter with the means adapted to introduce liquid to be filtered being kept out of operation in order substantially to remove all liquid from said filter, and that a pressurized gas may be introduced into the filtrate receiving chamber with said washing means being kept out of operation.

The invention will be explained herebelow in greater detail with reference to one embodiment thereof, reference being made to the attached drawing wherein.

Figure 1:
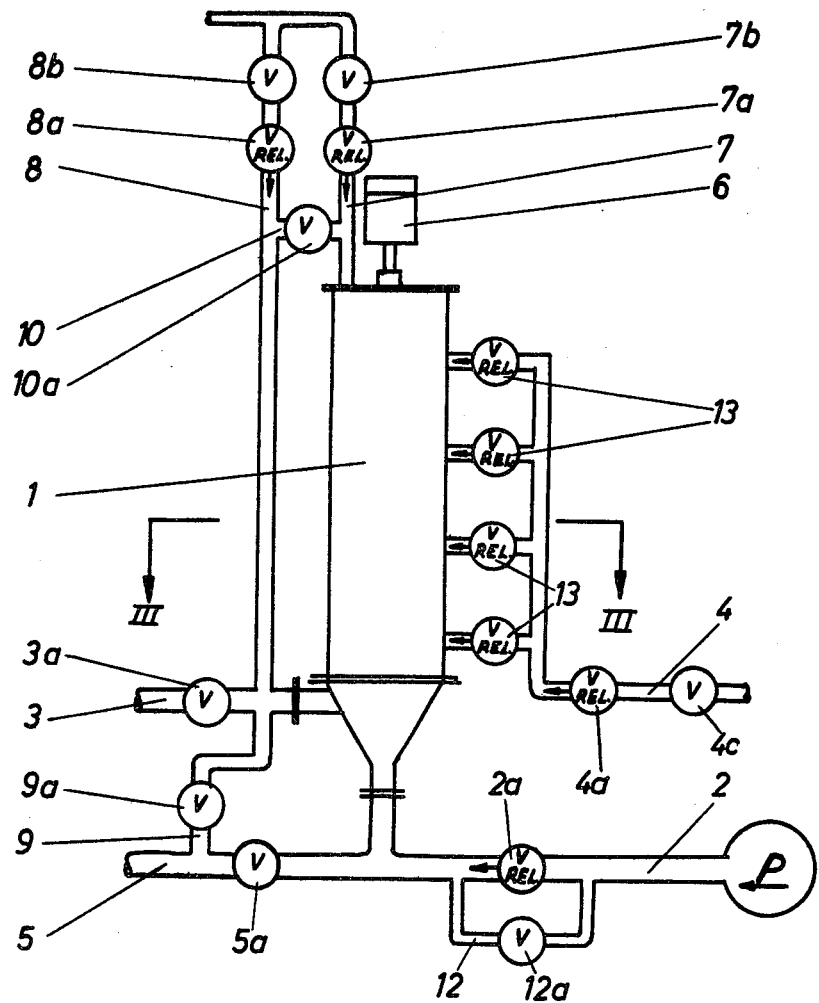
FIG. 1 is a diagrammatic side elevational view of a pressure filter and its associated system of conduits.

As will be seen in FIG. 1, the apparatus for carrying into effect the method of the invention comprises an upright filter housing 1 to the bottom of which there is connected a supply conduit 2 adapted to feed the liquid to be treated to said filter housing. Supported within filter housing 1 is a filter unit or cartridge 11 shown in FIG. 3, the interior of said unit or cartridge being connected to a discharge conduit 3 for the filtrate.

Figure 2:
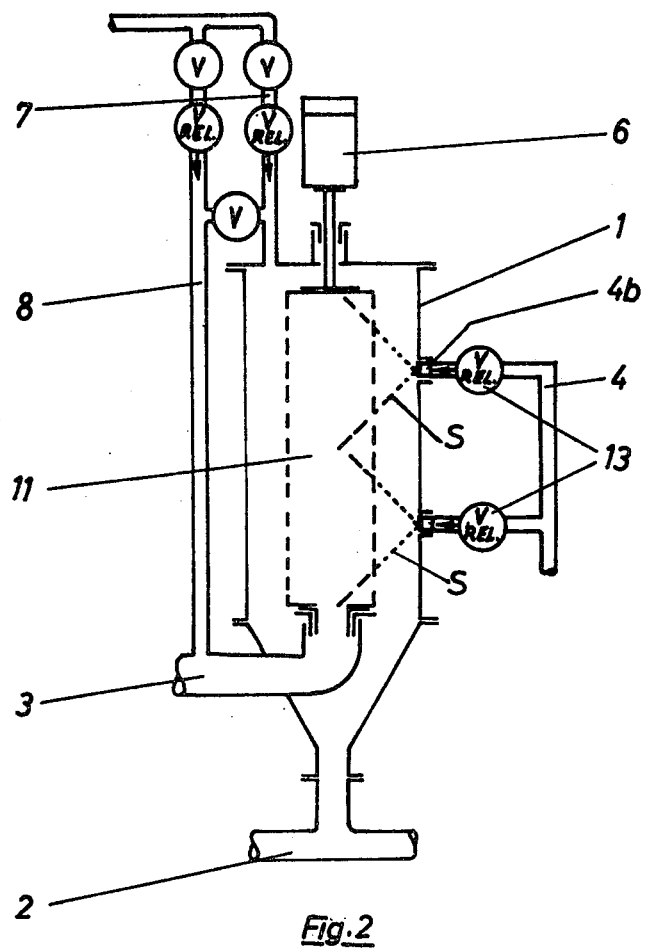
FIG. 2 is a vertical cross-sectional view of the pressure filter of FIG. 1.
Figure 3:
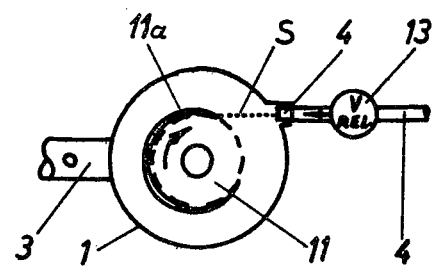
FIG. 3 is a horizontal cross-sectional view taken along the line III—III of FIG. 1.

During filtration, the contaminated liquid is pumped into the filter housing 1 towards the top thereof via the supply conduit 2 and a non-return valve 2a so as to traverse the filter cartridge 11 as the contaminating substances are being separated from the liquid and deposited on the outer surface of the cartridge, whereupon the liquid is discharged from the filter housing via an open valve 3a connected in discharge conduit 3. All other connections leading to filter housing 1 and all valves associated with such connections are closed during the filtering operation. As soon as the filtering capacity of the filter is reduced to a predetermined level, due, for example, to clogging of the filter medium by the sludge or filter cake 11a retained thereon, the feed pump P will be rendered inoperative in order to interrupt the supply of liquid via supply conduit 2. At the same time a conduit 7 provided with a non-return valve or non-return damper 7a is employed to introduce a pressurized gas, for example pressurized air, into the pressure or charging chamber of the filter. This supply of a pressurized gas serves a number of purposes described herebelow. The liquid present in filter housing 1 which is subjected to the pressure of the gas introduced is forced back towards supply conduit 2 via a bypass conduit 12 including a valve 12a which has been opened for this purpose. The bypass conduit 12 is conveniently connected to the lowermost portion of supply conduit 2 as this constitutes the lowermost point of the entire system so that the selection of this point will enable the filter housing 1 and supply conduit 2 to be completely purged of liquid not yet filtered. Another important function of the pressure of the gas introduced resides in the fact that it will retain the sludge or filter cake on filter cartridge 11. It should be noted in this connection that there exist certain types of contaminants which have a low degree of adhesiveness and would, therefore, drop off filter cartridge 11 were it not for the application of gas pressure, such dropping-off being undesirable as the filter cake would find its way into the liquid not yet filtered and would thus increase its degree of contamination during the purging operation. During this operation, also the valve 3a connected in discharge conduit 3 is kept open so that all of the filtrate present in the filtrate receiving chamber and in a portion of discharge conduit 3 will be forced out by the pressurized air traversing the filter cartridge 11 in filter housing 1 and entering the filtrate receiving chamber. During the purging operation, the gas pressure will of course have to exceed the drop in pressure which occurs when air is being forced through the filter medium of cartridge 11. As soon as the purging operation has been completed, for example by means of a timing relay, the discharge valve 3a, the valve 12a connected in bypass conduit 12, and the valve 7b connected in air supply line 7 are closed. Following this, one or more washing fluid conduits 4 connected to a common non-return valve 4a as shown in FIG. 1 are rendered operative in order to supply a washing fluid to a plurality of washing nozzles 4b which are directed towards the outer periphery of the filter medium cartridge 11 in such a manner that the washing fluid will form a spray pattern substantially covering the entire length of the cartridge. As the washing operation is initiated, there will simultaneously be opened a valve 5a included in a discharge conduit connected to the bottom of filter housing 1, and a pressurized-gas valve 8b connected in a conduit 8. Conduit 8 which includes a non-return valve 8a and which is adapted, for example, to supply compressed air, is connected to discharge conduit 3 so as to make it possible to introduce compressed air into the filtrate receiving chamber in a direction opposite to the direction in which compressed air was introduced during the above-described purging operation. As shown in FIGS. 1 and 2, there is coupled to cartridge 11 carrying the filter medium a motor 6 adapted to move, e.g. rotate, said cartridge. During the washing operation, the aforesaid valves 5a and 8b are kept open and the motor 6 is preferably energized in such a manner as to rotate the filter cartridge 11 in a direction opposite to the direction in which the washing medium is discharged by nozzles 4b, care being taken, according to the invention, to have the washing medium impinge substantially in a tangential direction on the filter medium so as to act in the manner of a doctor blade peeling or cutting the filter cake 11a off its outer periphery. The washing medium employed may comprise a liquid or a mixture of gas and liquid and/or gas and be discharged from the nozzles 4b in the form of jets S as shown in FIG. 3. The compressed air introduced into the interior of filter cartridge 11 via conduits 8 and 3 functions to pry off the sludge layer or filter cake from the periphery of the cartridge or to puncture the cake and thus to cause the sludge or a sludge-plus-liquid mixture to be discharged as quickly as possible via discharge conduit 5 so as to lower the upper level of such mixture down to the bottom of cartridge 11 and thus to prevent said mixture from impairing the action of the washing fluid on the cartridge. In order to make it impossible for still-contaminated liquid to find its way to the nozzles 4b and to prevent the nozzles from being clogged by sludge particles during the normal filtering operation, non-return valves 13 are arranged in the manner shown in FIGS. 1 and 2, one non-return valve being associated with each nozzle and disposed at a small distance therefrom.

Upon the washing step being completed, the supply of washing medium via conduit 4 is interrupted by a valve 4c. However, the supply of pressurized gas via conduit 8 is continued for a suitable short period of time in order to force out even the remainder of the washing medium and the sludge from the bottom of filter housing 1 and discharge conduit 5. In order to permit such residues to be flushed out as completely as possible, a conduit 9 shown in FIG. 1 is connected between the two discharge conduits 3 and 5, there being a valve 9a connected in such conduit. At the end phase of supply of pressurized gas, valve 5a is closed, whereas valve 9a is kept open so that the remainder, if any, of the washing medium within conduit 3 will be drained via conduit 9 towards discharge conduit 5. Finally, valves 8b and 9a will again be closed to stop the washing operation.

It has been found, according to the invention, that it is to be preferred to perform the washing step in such a manner that there will remain a thin layer of sludge or filter cake on filter cartridge 11.

For the purpose of venting the filter prior to the reinstitution of the filtering operation, i.e. prior to the resumption of the introduction of liquid to be filtered, there has been provided a ventilating duct 10 connected between conduits 7 and 8 and including a valve 10a. As liquid to be filtered is again introduced into the filter via supply conduit 2, valve 10a and discharge valve 3a are opened to permit air under pressure present in the filter to escape via conduit 8 towards conduit 3. Upon filter housing 1 having been completely refilled with liquid, valve 10a is closed to render the filter ready for the next filtering operation. As mentioned earlier and as shown in FIGS. 1 and 2, the inlet connection between supply conduit 2 and the filter is preferably provided at the bottom of the filter. Should any residual sludge remain in the bottom of the filter after regeneration of the filter medium, such residue will be stirred up by the incoming liquid, such action tending to prevent the accumulation of sludge.

Figure 4:
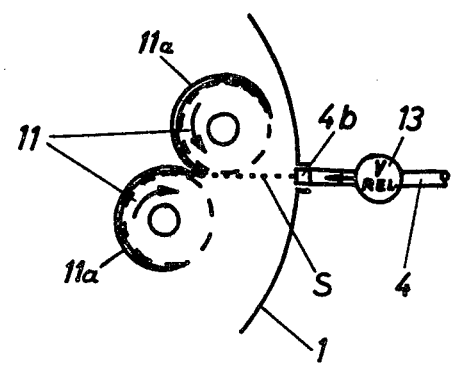
FIG. 4 is a fragmentary cross-sectional view similar to FIG. 3 of a modified embodiment of the invention.

As will be seen from the above description, the filter is constructed in such a manner that the quantity of contaminated liquid which may be lost is kept at a minimum and that such liquid cannot be diluted during regeneration of the filter medium. It should be understood that the embodiment described in the foregoing and shown in the drawings accompanying the specification is merely to be considered an example of an arrangement adapted to carry into effect the method of the invention. In other words, the applicability of such method is not restricted to such embodiment. This goes to show that, whilst in the case of the embodiment described above the method of the invention is employed in conjunction with a filter of the cartridge type, the said method is applicable also to other filter structures such as web-type filters, drum-type filters, etc. It should also be understood that the filter housing 1 described may accomodate a plurality of filter elements or cartridges 11, the arrangement being such that it is possible to regenerate one or more of such elements while other elements are being kept in operation, such an arrangement permitting a continuous filtering operation to be performed. Finally, it is also possible to arrange for a plurality of filter elements or cartridges to be served by a single washing means, with the cartridges preferably being alternately arranged on both sides of the jets or substantially tangential thereto. An embodiment of such an arrangement comprising two cartridges 11 is shown in FIG. 4, the cartridges in this embodiment being rotated in opposite directions, so that the filter cakes 11a of both cartridges are peeled off simultaneously.

In the drawings and in the specification, there has been set forth a preferred embodiment of the invention and, although specific terms are employed, they are used in a generic and descriptive sense only and not for the purpose of limitation, the scope of the invention being defined in the claims.

What I claim is:

1. A method of regenerating a pressure filter apparatus comprising a first chamber and a second chamber separated by a filter media within said apparatus, said method comprising the steps of:
   (a) feeding a liquid to be filtered into said first chamber and filtering said liquid through said media until said media requires cleaning,
   (b) discontinuing step (a),
   (c) feeding a pressurized gas into said first chamber for a time sufficient to remove unfiltered liquid from said media,
   (d) discontinuing step (c),
   (e) feeding a liquid wash medium into said first chamber, while simuntaneously feeding a pressurized gas into said second chamber for a time sufficient to clean said filter media, and
   (f) discontinuing step (e), whereby said steps otherwise extend the serviceable life of said filter.

2. The method of claim 1, wherein upon the completion of the washing step, a thin layer of deposited material remains on the surface of the filter medium.

3. The method of claim 1, wherein the last-mentioned step of introducing a pressurized gas is continued after the interruption of the supply of the washing medium until the filtrate receiving chamber has been purged of the washing medium, with the filter then being refilled with the liquid to be filtered and the filtering operation then re-instituted.

4. The method of claim 1, wherein the filter medium is moved in relation to the washing medium during said washing step.

5. The method of claim 1, wherein during the washing step, the washing medium impinges on the filter medium in a tangential or a substantially tangential direction in relation thereto.

6. The method of claim 1, wherein the washing medium comprises at least one of a liquid and a plurality of gas jets.

7. A regenerative pressure filtering apparatus comprising a first chamber and a second chamber separated by a filter media within said apparatus, said apparatus further comprising:
   (a) means feeding a liquid to be filtered into said first chamber and filtering said liquid through said media until said media requires cleaning,
   (b) means discontinuing the feeding of said liquid when said media requires cleaning,
   (c) means feeding a pressurized gas into said first chamber for a time sufficient to remove unfiltered liquid from said media,
   (d) means for discontinuing said means feeding a pressurized gas.
   (e) means for substantially extending the useful life of said filter media consisting of means simultaneously feeding a liquid wash medium into said first chamber and a pressurized gas into said second chamber and,
   (f) means for discontinuing the feeding of wash medium to said first chamber and pressurized gas to said second chamber when said media is cleaned, whereby the useful life of said filter is extended.

8. The filtering apparatus of claim 7, wherein said valve means are controlled such that the supply of said pressurized gas to said filtrate receiving chamber is continued for a predetermined period of time after said washing means have been rendered inoperative.

9. The filtering apparatus of claim 7, wherein the conduit supplying liquid to be filtered has connected therein a non-return valve, and said conduit has connected thereto on opposite sides of said non-return valve a bypass conduit having connected therein a valve to return liquid not yet filtered from said filter housing to said supply means upon the introduction of pressurized gas into said pressure chamber.

10. The filtering apparatus of claim 9, wherein the nozzles of said washing means are provided with non-return valve means to prevent clogging of said nozzles during periods of inoperation of said washing means.

11. The filtering apparatus of claim 7, further comprising a motor for moving said filter medium in relation to said washing means.

12. The filtering apparatus of claim 7, wherein said washing means comprises a plurality of nozzles which are arranged in such a manner that their axes extend in a substantially tangential direction towards the priximal surface of said filter medium.

13. The filtering apparatus of claim 12, wherein said filter medium is moved such that the proximal surface thereof moves in a direction opposite to the direction in which the washing medium is discharged by said nozzles.

14. The filtering apparatus of claim 12, wherein each of said nozzles causes the discharged washing medium to simultaneously impinge on the filter media of two adjacent filtering units.

15. The filtering apparatus of claim 7, wherein the supply and discharge conduits and the washing medium discharge conduit are at the lowermost portion of said filter housing.

16. The filtering apparatus of claim 7, further comprising a venting conduit to permit pressurized gas to escape from said filter housing during the refilling of said filter housing with liquid to be filtered.

* * * * *